United States Patent [19]

den Toonder et al.

[11] Patent Number: 4,568,974
[45] Date of Patent: Feb. 4, 1986

[54] VIDEO SCRAMBLING BY THE APPLICATION OF A VARIABLE PERIODIC SCRAMBLING WAVEFORM

[75] Inventors: Pieter den Toonder, Dordrecht, Netherlands; Dennis E. Burke, Elk Grove Village, Ill.; Ronald L. Forbes, McHenry, Ill.; James F. Stoffer, Cary, Ill.

[73] Assignee: Oak Industries Inc., Rancho Bernardo, Calif.

[21] Appl. No.: 437,349

[22] Filed: Oct. 28, 1982

[51] Int. Cl.⁴ .......................... H04N 7/16; H04K 1/02
[52] U.S. Cl. ..................................... 358/114; 358/118; 358/120; 358/123; 358/124
[58] Field of Search ............... 358/114, 118, 120, 123, 358/124

[56] References Cited

U.S. PATENT DOCUMENTS

| | | | |
|---|---|---|---|
| 4,308,556 | 12/1981 | Osaka | 358/114 |
| 4,353,088 | 10/1982 | Toonder et al. | 358/120 |
| 4,447,828 | 5/1984 | Toonder | 358/123 |
| 4,454,543 | 6/1984 | Lund et al. | 358/118 |

FOREIGN PATENT DOCUMENTS 0841627  7/1960  United Kingdom ............... 358/124

*Primary Examiner*—S. C. Buczinski
*Attorney, Agent, or Firm*—Kinzer, Plyer, Dorn & McEachran

[57] ABSTRACT

A means for scrambling video signals by the application of a periodic scrambling waveform which has the effect of altering the normal amplitude relationship between horizontal sync and the video picture portion of a horizontal line uses the comparison between the brightness level of the video signal during a predetermined time period with a reference as a means for varying the amplitude of the periodic scrambling waveform.

6 Claims, 2 Drawing Figures

VIDEO SCRAMBLING BY THE APPLICATION OF A VARIABLE PERIODIC SCRAMBLING WAVEFORM

SUMMARY OF THE INVENTION

The present invention relates to the scrambling or coding of television signals, for example having utility in subscription television.

A primary purpose of the invention is a means for scrambling a video signal by the application of a periodic scrambling waveform which changes the normal amplitude relationship between horizontal sync and the video picture portion of the horizontal line.

Another purpose is a scrambling system of the type described which varies or alters the depth of scrambling modulation in accordance with variations in the brightness level of the video signal over a predetermined time period.

Another purpose is a scrambling system of the type described in which the brightness level of each horizontal line is compared with a reference, for example one of several IRE levels determined by sampling the back porch, with the color burst removed, during horizontal blanking of the video signal.

Another purpose is a scrambling system of the type described in which the depth of modulation of the applied periodic scrambling waveform may be varied in defined steps.

Another purpose is a scrambling system of the type described which does not require a control signal from the transmitter to the receivers to indicate when the form or mode of scrambling has changed.

Other purposes will appear in the ensuring specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
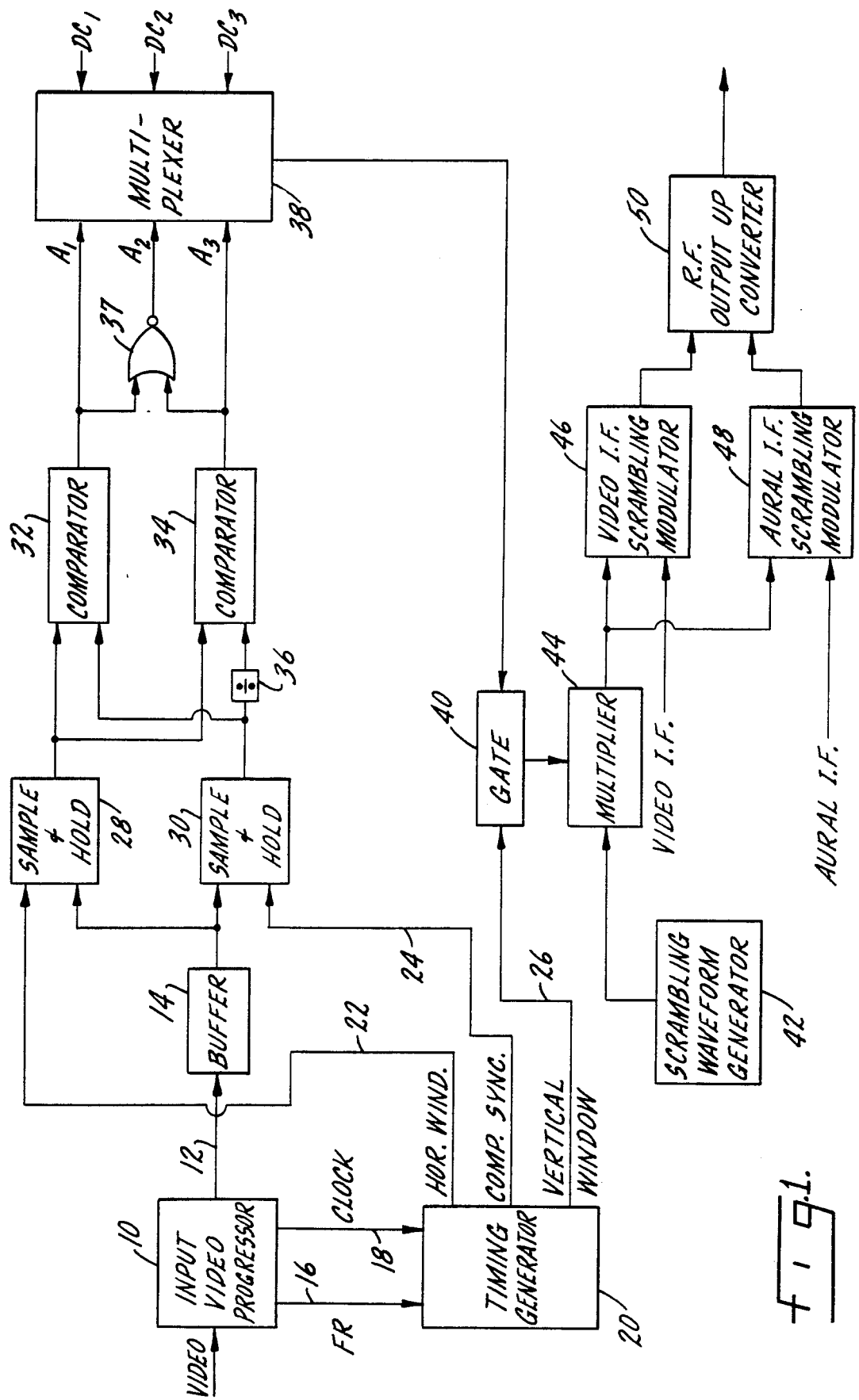
FIG. 1 is a block diagram of a scrambling transmitter of the type disclosed herein.

The present application relates to the coding or scrambling of video signals, for example as used in subscription television. The particular coding arrangement may have application in cable television (CATV), over-the-air subscription television (STV) and direct broadcast satellite subscription television (DBS). The particular coding means disclosed may have further utility in other subscription television environments.

Specifically, the video signal is coded by the application of a periodic waveform which has the effect of altering the normal amplitude relationship between horizontal sync and the video picture portion of a horizontal line. As described in U.S. Pat. No. 4,024,575, assigned to the assignee of the present application, such a periodic signal may be a sine wave having a frequency the same as that of the video signal horizontal line frequency, 15.75 KHz. Harmonics of the horizontal line frequency, for example the second harmonic of 31 KHz are also satisfactory. The invention should not be limited to the application of a sine wave as the means for altering the amplitude relationship between sync and the video picture portion of a horizontal line. However, a 15.75 KHz sine wave and a 31 KHz sine wave have both been found to be quite satisfactory in terms of distorting a video signal to the point where it is unrecognizable and yet permitting relatively simple decoding at the receiver so that the television subscriber may have a distortion free picture on his set.

The present invention is more specifically concerned with a means for altering the depth of modulation of the applied scrambling waveform on an unpredictable basis so that those seeking to pirate the video signal will have substantial difficulty in decoding and thus providing a distortion free picture without paying the required fee. The depth of modulation is varied in accordance with changes in the picture content of the video signal and in particular in accordance with changes in the brightness level of the video signal. The time interval between changes in coding mode or the depth of modulation of the coding signal may vary from a few lines to a substantial number of horizontal lines. As disclosed herein, whenever the comparison in brightness level between a particular horizontal line and a reference, which may be derived from the horizontal blanking back porch with the color burst removed, changes, the depth of scrambling modulation will change. However, such a change cannot take place instantaneously, but rather will take several horizontal lines before the full effect of the change in modulation depth actually is effective. Thus, the change in modulation depth may take place several times in a single frame, again depending upon whether or not the horizontal lines of a particular frame have a substantial variation in brightness level.

As disclosed herein, there may be three predetermined reference levels, for example above 40 IRE units, below 20 IRE units and between 20 and 40 IRE units. Each video horizontal line will have a measured brightness relative to one of the three specified levels and the specific brightness level will determine which depth of scrambling modulation is applied to the video signal. The invention should not be limited to any specific number of reference levels and the invention also has application in a scrambling arrangement in which the depth of scrambling modulation will vary linearly or continually with changes in the brightness level of the horizontal lines. In addition, there may be a combination whereby a portion of the change in depth of scrambling modulation will vary linearly and for other portions of the reference range there may be defined steps or defined levels of scrambling depth. The invention is more specifically concerned with a means to vary the depth of modulation or to alter the normal amplitude relationship between horizontal sync and the video picture portion of a horizontal line in accordance with changes in the picture content or changes in the brightness level of the video signal.

In FIG. 1 a standard video signal is applied as one input to an input video processor 10 which provides a monochromatic video output along line 12 to a buffer 14. A frame reference and clock signal are provided along lines 16 and 18 from input video processor 10 to a timing generator 20 which will provide outputs of horizontal window, on line 22, composite sync on line 24 and vertical window on line 26. These timing signals are used in the scrambling control as described hereinafter.

Buffer 14 is used to attenuate the video signal to a prescribed limit and the output of buffer 14 provides inputs for two sample and hold circuits 28 and 30 which are essentially storage capacitors. Sample and hold circuit 28 is triggered by horizontal window on line 22 from timing generator 20 and sample and hold circuit 30 is triggered by composite sync on line 24, also from timing generator 20. Sample and hold circuit 28 is determining the brightness level of each horizontal line and will be triggered to provide an output by horizontal window. The output from sample and hold circuit 28 provides inputs for comparators 32 and 34. Sample and hold circuit 30 provides a reference to be used in comparison with the brightness level as provided by sample and hold circuit 28. Sample and hold circuit 30 is triggered by composite sync and the reference will essentially be the voltage level of the back porch of the blanking portion of a horizontal line with the color burst removed, as the color burst will be stripped by input video processor 10. The reference signal which utilizes the back porch as described to account for variations in the peak-to-peak voltage of the video signal provides a direct input for comparator 32 and provides a divided input for comparator 34, with the input for the latter comparator being reduced from the input for comparator 32 by a divide circuit 36. For example, in utilizing the reference levels specified above, a reference of 40 IRE units will be provided to comparator 32 and a reference of 20 IRE units will be provided for comparator 34. If the brightness level as determined by sample and hold circuit 28 is greater than 40 IRE units, the output from comparator 32 will be high. If the brightness level is less than 20 IRE units, the output from comparator 34 will be high. If the output from sample and hold circuit 28 is between 20 and 40 IRE units, the outputs of comparators 32 and 34 will both be low, but the output from NOR gate 37 will be high.

A multiplexer 38 will have inputs of three DC levels indicated at DC 1, DC 2 and DC 3. These three levels are used to vary the depth of modulation of the scrambling waveform. Depending upon which of inputs A1, A2 or A3 is high, as described above, the output from the multiplexer will be one of the three DC levels provided at its input. The output from multiplexer 38 is connected to a gate 40 which is triggered by vertical window on line 26.

A scrambling waveform generator is indicated at 42 and may, for example, provide a 15.75 KHz sine wave as one form of periodic scrambling waveform. The scrambling waveform generator provides an input to a multiplier 44 which is used to vary the amplitude of the scrambling waveform in accordance with the DC level provided by multiplexer 38 through gate 40. Any time during the period of the vertical window gating signal which is from line 46 to line 238 of a vertical field, the voltage level as provided by multiplexer 38 can be used to vary the amplitude of the scrambling waveform through multiplier 44.

A video IF scrambling modulator is indicated at 46 and an aural IF scrambling modulator is indicated at 48. These two modulators receive the video and aural signals at IF frequencies, respectively, with the output of the two modulators being provided to an RF up converter 50. The output from converter 50 is the video and aural signals at a specific carrier frequency for a designated television channel. Separate video and aural IF scrambling modulators are utilized because in the scrambling system illustrated in U.S. Pat. No. 4,024,575 there is a greater depth of scrambling modulation on the aural carrier than on the video carrier so that decoding may be accomplished in a closed loop receiver circuit without residual scrambling remaining in the picture signal.

The decoding circuit may be substantially as described in U.S. Pat. No. 4,024,575 which is a closed loop form of receiver-decoder with the scrambling modulation from the aural carrier being used to provide the decoding signal for both the video and aural carriers. Since the decoder utilizes a closed loop circuit, it is not necessary to advise the decoder when there has been a change in the depth of scrambling modulation at the transmitter. The decoder will automatically compensate for any change in depth of scrambling modulation or amplitude of scrambling modulation since it functions as an automatic gain control circuit. This is particularly advantageous in that no control signals need be sent from the transmitter to the receivers and thus there is no way for non-paying non-subscribers to be advised when a change in coding mode has taken place.

Figure 2:
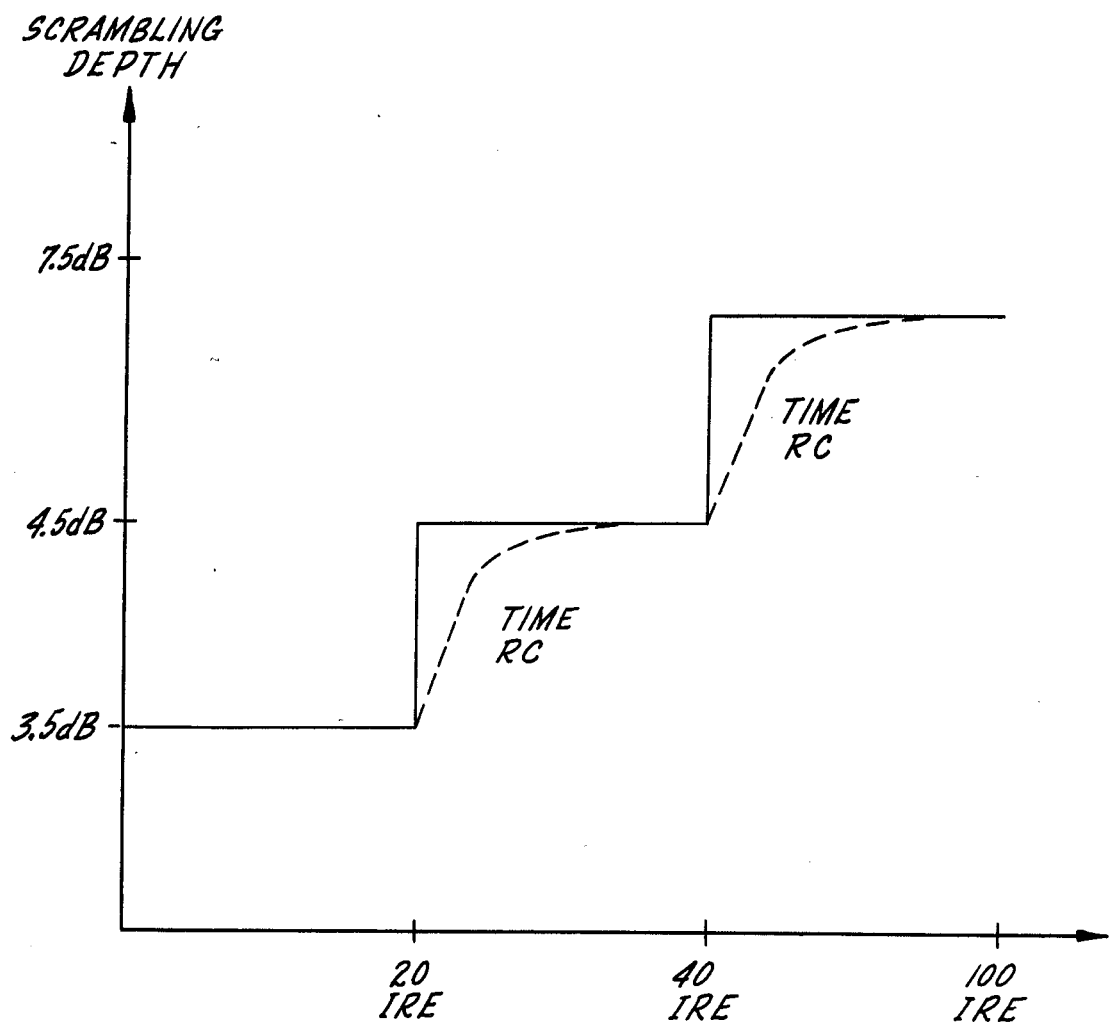
FIG. 2 is a waveform diagram illustrating the scrambling levels which may be applied to the transmitted video signal.

As particularly illustrated in FIG. 2, the change in the depth of scrambling modulation is not instantaneous, although the gating signals to cause such change may be. Because of the RC time constants involved in the circuits, it takes a short period of time, for example as many as 15-20 horizontal lines, before the new depth of scrambling modulation will be reached. For example, in FIG. 2 the depth of scrambling modulation is indicated on the vertical axis with the reference brightness levels being indicated on the horizontal axis. Note that a change in the depth of scrambling modulation from, for example, 3.5 dB, representing 20 IRE units, to 4.5 dB, representing a brightness level between 20 and 40 IRE units, does not take place instantaneously, but will take place in a more gradual manner over several horizontal lines as illustrated in broken lines. If the change in brightness level of the video picture, as measured by individual horizontal lines, is quite rapid, it can been seen that there will be a generally constantly changing depth of scrambling modulation as the RC time constants will not permit a rapid change from one level to another. In effect, this would provide a constantly changing depth of scrambling modulation which would be most difficult for non-paying subscribers to follow, but which would present no problem to closed loop decoders of the type described in the above patent.

Whereas the preferred form of the invention has been shown and described herein, it should be realized that there may be many modifications, substitutions and alterations thereto.

The embodiments of the invention in which an exclusive property or privilege is claimed are defined as follows:

1. Means for scrambling video signals including means for applying a periodic scrambling waveform to the video signal which has the effect of altering the normal amplitude relationship between horizontal sync and the video picture portion of a horizontal line, means for determining the brightness level of individual horizontal lines, means for determining a reference signal level related to the signal level of an interval of the blanking portion of a horizontal line, means for comparing the brightness level of individual horizontal lines with the reference signal level, including a plurality of comparators, each having one input from the means for determining the brightness level of individual horizontal lines, the reference signal level providing a second input for one comparator and a signal related to but different from the reference signal level providing a second input for another comparator, the outputs from said comparators providing a plurality of comparisons between the reference signal level and the brightness level of individual horizontal lines, and means for varying the amplitude of the periodic scrambling waveform in accordance with the plurality of comparisons between said brightness level and the reference signal level.

2. The scrambling means of claim 1 further characterized in that said periodic waveform has a frequency related to the horizontal line frequency of the video signal.

3. The scrambling means of claim 1 further characterized in that said periodic scrambling waveform is a sine wave having a frequency of 15.75 KHz.

4. The scrambling means of claim 1 further characterized in that said periodic scrambling waveform is a sine wave having a frequency of 31 KHz.

5. The scrambling means of claim 1 further characterized in that said predetermined time period is equal to a horizontal line.

6. The scrambling means of claim 1 further characterized in that, said means for varying the amplitude of the periodic scrambling waveform includes a plurality of individual signal levels, one for each of the plurality of comparisons whereby the outputs of said comparators determine what level of amplitude of the periodic scrambling waveform is applied to the video signal.

* * * * *